No. 742,124. Patented October 20, 1903.

UNITED STATES PATENT OFFICE.

ALBERT L. MARTIN, OF CLINTON, IOWA, ASSIGNOR TO ALONZO C. TENNEY, OF CLINTON, IOWA.

PROCESS OF MANUFACTURING VEGETABLE GELATIN.

SPECIFICATION forming part of Letters Patent No. 742,124, dated October 20, 1903.

Application filed October 16, 1902. Serial No. 127,577. (No specimens.)

*To all whom it may concern:*

Be it known that I, ALBERT L. MARTIN, a citizen of the United States, residing at Clinton, in the county of Clinton and State of Iowa, have invented certain new and useful Improvements in Processes of Manufacturing Vegetable Gelatin, of which the following is a specification.

This invention relates to a certain new and useful improvement in processes or methods of manufacturing vegetable gelatin.

I take a heretofore practically waste product (a moss) which from experiment I have found to contain mucilaginous and albuminous matter, as well as cellulose, mineral matter, and water, and subject this to a treatment which produces a gelatin or food product which when used with milk will not coagulate the latter, and hence requires no soda. Furthermore, there is no disagreeable odor while cooking, no chemicals are required, and the pudding or food produced therefrom will harden in a comparatively short space of time.

I may use any sea moss or moss which will gelatin; but the moss which I prefer to use is the *Chrondrus carraheen*, or Irish moss, (a seaweed consisting of two algæ—the *Chrondrus crispus* and *Gigartina mammilisa*.) The moss is horny, translucent, pale-yellowish white, and smells and tastes saline. Like gelatin, it swells in cold water, dissolves in hot water, and gelatinizes upon cooling.

In carrying out my process I take the moss, thoroughly wash it and cleanse it from all sand and other impurities, bleach it, preferably in the sun, comminute it, then boil it in water and subsequently strain it, and then boil the resultant product down to a syrupy consistency. This is then spread out upon large pans and subjected to gentle heat to evaporate it, whereby I get large sheets, resembling somewhat isinglass. This is then shredded, and when treated like other gelatins it dissolves readily and gives a superior quality of jelly.

I may dry or evaporate in carrying out my process by any character of heating or drying apparatus which would perform the function in a proper manner.

A pudding or blanc-mange made from my improved product will harden on ice in less than an hour's time, and it has been found to be much cheaper and purer than animal gelatin, besides hardening quicker and being far more palatable.

I may place the product on the market in the forms of sheets; but I prefer to take these sheets and shred them before placing on the market.

The product (a vegetable gelatin) is readily distinguished from the ordinary animal gelatin by its lacking in that odor so common to animal gelatins, by its color, and by the fact that it will not coagulate the milk with which it may be used.

My vegetable gelatin is of superior quality, is cheaper, purer, goes farther, hardens quicker, and is much preferable to and more palatable than animal gelatin.

In the process of drying my product I have found that the best results are obtained by the use of metal sheets, such as aluminium, although it may be dried in any desired manner.

What I claim as new is—

1. The herein-described process of producing a vegetable gelatin, which consists in boiling a moss, straining the same, boiling the product down to a syrupy consistency, evaporating and shredding, as set forth.

2. The herein-described process of producing a vegetable gelatin, which consists in washing moss, bleaching it, comminuting it, boiling in water, straining, boiling the resultant product and evaporating, as set forth.

3. The herein-described process of producing a vegetable gelatin, which consists in washing moss, bleaching it, comminuting it, boiling in water, straining, boiling the resultant product, evaporating, and then shredding, as set forth.

In testimony whereof I affix my signature in presence of two witnesses.

ALBERT L. MARTIN.

Witnesses:
  MAMIE C. DUFFY,
  IDA BLODT.